US012744773B2

(12) United States Patent
Lechner

(10) Patent No.: US 12,744,773 B2
(45) Date of Patent: Sep. 22, 2026

(54) NETWORK RESOURCE ACCESS USING A TOKEN FROM A REMOTE SECURITY SYSTEM

(71) Applicant: HEWLETT PACKARD ENTERPRISE DEVELOPMENT LP, Spring, TX (US)

(72) Inventor: Bryan Elliot Lechner, Richfield, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 33 days.

(21) Appl. No.: 19/050,357

(22) Filed: Feb. 11, 2025

(65) Prior Publication Data

US 2026/0238637 A1 Aug. 13, 2026

(51) Int. Cl.
*H04L 9/40* (2022.01)

(52) U.S. Cl.
CPC ................................ *H04L 63/0838* (2013.01)

(58) Field of Classification Search
CPC ................................................... H04L 63/0838
See application file for complete search history.

(56) References Cited

U.S. PATENT DOCUMENTS 12,021,938 B1 * 6/2024 Suriyal ................. H04L 9/3228
2016/0285853 A1 * 9/2016 Liu ....................... H04L 67/141
2018/0041496 A1 * 2/2018 Shivanna ............ H04L 63/0823
2019/0035181 A1 * 1/2019 Musabeyoglu ......... G06F 21/35
2020/0252380 A1 * 8/2020 Sathe ...................... H04L 63/08
2023/0198783 A1 * 6/2023 Sorensen .............. G06F 3/0679
713/156
2024/0056806 A1 * 2/2024 Milton ................ H04W 12/069

OTHER PUBLICATIONS

Cloudfare, Inc., "What is Zero Trust Network Access (ZTNA)?", downloaded Jan. 11, 2025 (8 pages).
Wikipedia, "Internet Control Message Protocol", available online at <https://en.wikipedia.org/w/index.php?title=internet_control_message_protocol&oldid=1272476077>, Jan. 28, 2025, 9 pages.

* cited by examiner

*Primary Examiner* — Chau Le
(74) *Attorney, Agent, or Firm* — Trop, Pruner & Hu, P.C.

(57) ABSTRACT

In some examples, a security system receives session establishment information from a client device connected to a network, the session establishment information to establish a session between the client device and the security system, wherein the security system is remote from the network. The security system receives, from the client device, a token sent to the client device by a network device of the network responsive to the network device detecting the session establishment information. The security system determines whether the token is authorized by the security system for an entity affiliated with the client device. The security system sends, based on the determining, a response indicating whether the token is authorized, wherein the token if authorized indicates that the network is operated by the entity that the electronic device is affiliated with.

20 Claims, 7 Drawing Sheets

NETWORK RESOURCE ACCESS USING A TOKEN FROM A REMOTE SECURITY SYSTEM

BACKGROUND

An electronic device can access a network by establishing a connection with an access device, which can be a wireless access device or a wired access device. The network has resources that are accessible to the electronic device once the electronic device connects to the network.

BRIEF DESCRIPTION OF THE DRAWINGS

Some implementations of the present disclosure are described with respect to the following figures.

Figure 1:
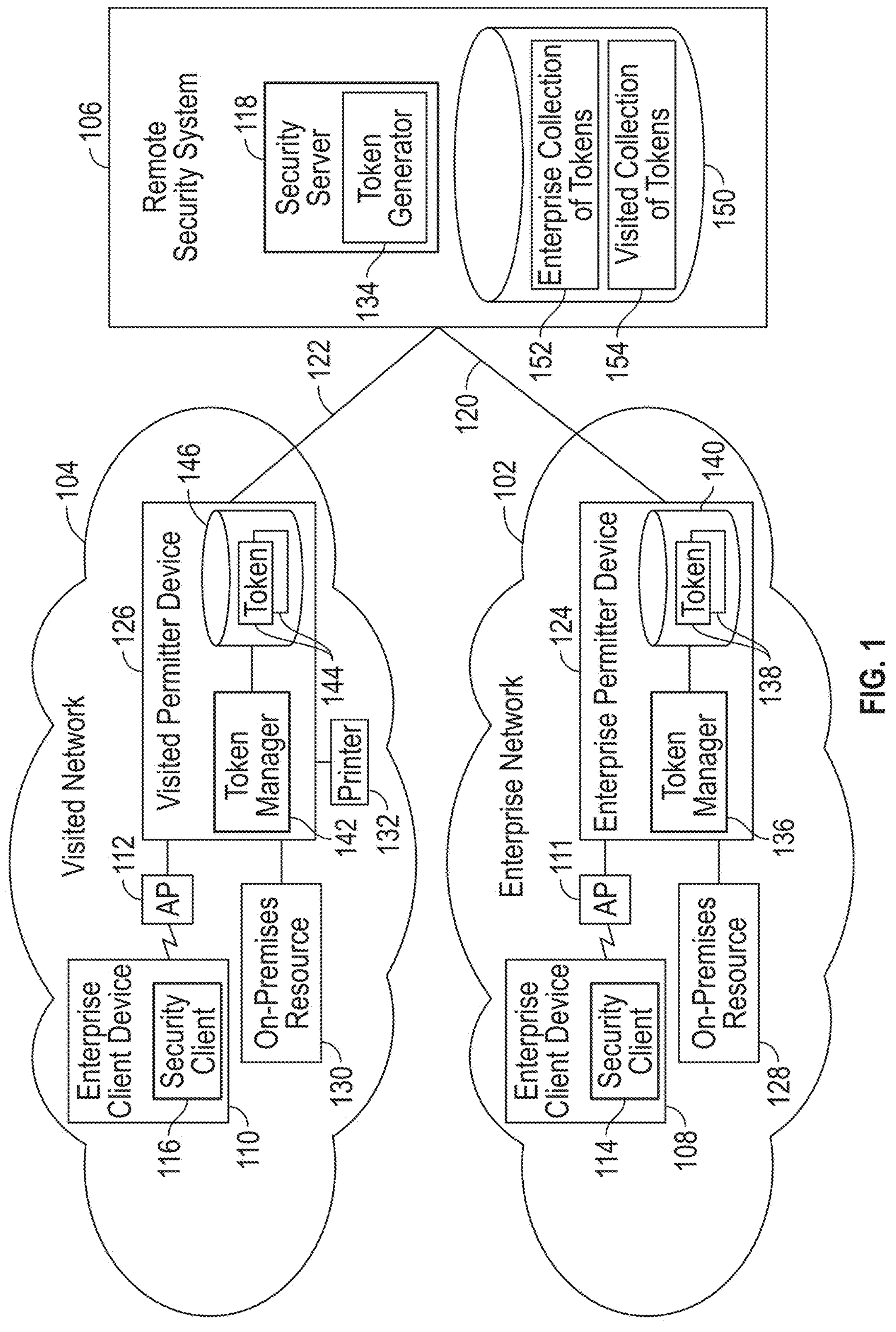
FIG. 1 is a block diagram of an arrangement including an enterprise network, a visited network, and a remote security system, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An electronic device can access a network by establishing a connection with an access device of the network. Before allowing access to resources of the network, authentication and authorization of the electronic device can be performed by a remote security system, such as a cloud security system operated in a cloud environment or another type of security system accessible over a remote communication link (e.g., the Internet). The remote security system is a security system that is remote from the network.

In some examples, the remote security system may force an electronic device connected to a network to communicate data traffic through the remote security system even if the electronic device is connected to an access device that is within the network. Such an access device is referred to as an "on-premises access device," and the electronic device connected to the on-premises access device is referred to as an "on-premises electronic device." To communicate with an on-premises resource (e.g., a server) connected to the network, the on-premises electronic device sends device-originated data traffic to the remote security system (for the remote security system to authenticate and authorize the data traffic), and the remote security system then sends the device-originated data traffic to the on-premises resource. The propagation of the device-originated data traffic from the on-premises electronic device to the remote security system back to the on-premises resource is referred to as a "hairpin." A hairpin refers to a data propagation that originates from a source within a network to an entity outside the network and back to a destination within the network. In the opposite direction, the on-premises resource sends resource-originated data traffic to the remote security system, which then sends the resource-originated data traffic to the on-premises electronic device. This propagation of the resource-originated data traffic is another hairpin. The round-trip propagation of data traffic between the on-premises electronic device and the on-premises resource through the remote security system results in a double hairpin, which adds latency to data communications and also consumes network bandwidth.

To avoid hairpins, the remote security system may support a bypass feature to allow an electronic device to bypass the remote security system when communicating with a specific network address (or a specific range of network addresses associated with a subnet) in a network. This specific network address or range of network addresses is referred to as a bypass network address or bypass range of network addresses. If the bypass feature is activated, the electronic device can directly access an on-premises resource at a bypass network address, without data traffic propagating through the remote security system. However, an issue associated with bypass features supported by remote security systems arises in a scenario where an electronic device associated with a first entity (entity A) connects to a visited network operated by a different second entity (entity B). Entity A may be an enterprise that operates an enterprise network, and entity B may be a retail outlet, a hotel, an airport, an individual, or any other entity that allows visitors to access the visited network operated by entity B. The electronic device when connected to the visited network can still interact with the remote security system, and the remote security system may activate the bypass feature to improperly allow the electronic device to directly access an on-premises resource of the visited network under certain conditions. For example, the enterprise network operated by entity A may share some network addresses with the visited network operated by entity B. If the electronic device seeks to access an on-premises resource of the visited network at a bypass network address that is shared between the enterprise network and the visited network, the electronic device may be granted direct access to the on-premises resource of the visited network at the bypass network address, when the requested access should have been denied based on an access control policy of the visited network. For example, the access control policy of the visited network may specify that electronic devices of visitors connected to the visited network should be denied access to certain on-premises resources of the visited network.

In accordance with some implementations of the present disclosure, a remote security system is able to detect, based on a token provided by an electronic device (referred to as a "client device"), whether the client device is connected to an enterprise network operated by an enterprise that the client device is associated with, or connected to a visited network operated by an entity that is different from the enterprise. The token provided by the client device to the remote security system was received by the client device from a permitter device in a network to which the client device is connected. The permitter device sends the token to the client device in response to the permitter device detecting session establishment information sent from the client device to the remote security system.

The session establishment information is to establish a session between the client device and the remote security system. In response to receiving the token from the client device, the remote security system determines whether the token is authorized by the remote security system for the enterprise affiliated with the client device. This determination is based on checking if the token is an authorized token provided by the remote security system to the enterprise affiliated with the client device. Based on the determination, the remote security system sends a response indicating whether the token is authorized, where the token if authorized indicates that the network is operated by the enterprise that the electronic device is associated with. The token if authorized can trigger activation of a bypass feature to allow the client device to directly access an on-premises resource of the network.

A "direct access" by a client device to an on-premises resource of a network refers to an access in which the client device is able to communicate data with the on-premises resource without the data propagating outside the network, such as to a remote security system. A "token" can refer to any information that is used to authorize an activity of a client device. The token may be in the form of an information element, a message, a signal, or any other indicator.

A bypass feature supported by a remote security system refers to a communication arrangement in which a client device connected to a network can exchange data with an on-premises resource of the network without involving the remote security system in authorizing the data exchange.

An "enterprise" can refer to an organization (e.g., a business concern, an educational organization, a government agency, a charitable organization, etc.), an individual or group of individuals, or any other entity.

FIG. 1 is a block diagram of an example arrangement including an enterprise network 102, a visited network 104, and a remote security system 106. The remote security system 106 can be implemented using one or more computers. The remote security system 106 is connected over a remote communication link 120 to the enterprise network 102, and the remote security system 106 is connected over a remote communication link 122 to the enterprise network 104. The remote communication links 120 and 122 can be in the form of wide area networks (WANs) or public networks (e.g., the Internet). In some examples, the remote security system 106 is a cloud security system deployed in a cloud environment. In other examples, the remote security system 106 can be part of a data center or another computing environment.

The enterprise network 102 is operated by an enterprise, and the visited network 104 is operated by an entity that is different from the enterprise. Enterprise client devices 108 and 110 are affiliated with the enterprise that operates the enterprise network 102. A client device is affiliated with the enterprise if the client device is owned by or is used by a user that has a defined relationship with the enterprise. For example, the user may be an employee or contractor of the enterprise, or the user has another type of defined relationship with the enterprise. Alternatively, the client device is affiliated with the enterprise if the client device is owned by or operated by the enterprise.

The visited network 104 is remotely located from the enterprise network 102. The visited network 104 can be a network that grants permission to users to connect to the visited network even though the users are not affiliated with the entity that operates the visited network 104. More generally, the visited network 104 is a network that is separate from the enterprise network 102.

In the example of FIG. 1, the enterprise client devices 108 and 110 affiliated with the enterprise that operates the enterprise network 102 are connected to different networks. The enterprise client device 108 is connected to the enterprise network 102. For example, the enterprise client device 108 is within a physical facility of the enterprise so that the enterprise client device 108 can connect to an access device, such as a wireless access point (AP) 111, that is part of the enterprise network 102.

On the other hand, the enterprise client device 110 can be outside a physical facility of the enterprise and is connected to the visited network 104. The enterprise client device 110 is connected to an access device, such as a wireless AP 112, that is part of the visited network 104. In other examples, instead of an AP, an access device can be in the form of a switch or any other type of network device that allows for connection of a client device to a network.

In other examples, there may be multiple client devices and access devices in each of the enterprise network 102 and the visited network 104.

The enterprise client device 108 includes a security client 114, and the enterprise client device 110 includes a security client 116. A security client can be in the form of a program (including machine-readable instructions) executed by a processing resource of an enterprise client device.

The security client in an enterprise client device can interact with a security server 118 in the remote security system 106. The security server 118 can be in the form of a program (including machine-readable instructions) executed by a processing resource of the remote security system 106.

The security client 114 or 116 can interact with the security server 118 to implement a security framework to authorize activities of the enterprise client device 108 or 110, respectively. In some examples, the security framework implemented by the security client 114 or 116 and the security server 118 can include a zero trust security framework, such as a Zero Trust Network Application (ZTNA) security framework. In the zero trust security framework, client devices are to be continually authenticated and authorized, even if the client devices are connected to access devices within a secured network (such as the enterprise network 102), before the client devices are granted access to resources of the secured network. The zero trust security framework grants access to network resources based on an access control policy.

In another example, the security framework implemented by the security client 114 or 116 and the security server 118 is a virtual private network (VPN) framework. The VPN framework allows a client device to establish a VPN to a secured network for access of resources of the secured network. In other examples, other types of remote security frameworks can be employed.

The enterprise network 102 includes an enterprise permitter device 124, and the visited network 104 includes a visited permitter device 126. A "permitter device" refers to a network device that supports data communications of client devices in a network. In some examples, a permitter device can include any or some combination of the following: a router that routes data packets based on network addresses (e.g., Internet Protocol (IP) addresses) in the data packets, a firewall device that implements firewall rules to determine whether data packets are allowed to be propagated through the firewall device, a gateway device that connects different networks, or any other type of network device. More generally, a "network device" propagates a data packet along a network path based on a data forwarding policy.

Although just one permitter device is shown in each of the enterprise network 102 and the visited network 104, in other examples, multiple permitter devices may be present in a network.

In some examples according to FIG. 1, the enterprise permitter device 124 is connected over the remote communication link 120 to the remote security system 106, and the visited permitter device 126 is connected over the remote communication link 122 to the remote security system 106. The enterprise network 102 also includes an on-premises resource 128 that may be accessible to a client device in the enterprise network 102 (if an access control policy of the enterprise network 102 is satisfied). Similarly, the visited network 104 includes an on-premises resource 130 that may be accessible to a client device connected to the visited network 104 (if an access control policy of the enterprise network 102 is satisfied). Each of the enterprise network 102 and the visited network 104 can include multiple on-premises resources. For example, another on-premises resource of the visited network 104 is a printer 132.

A "resource" can refer to a computing resource, a storage resource, a communication resource, a program, or any other resource with which a client device can interact. In examples according to FIG. 1, the on-premises resource 128 is connected to the enterprise permitter device 124, and the on-premises resource 130 and the printer 132 are connected to the visited permitter device 126.

The enterprise client device 108 can wirelessly connect to the AP 111, which is in turn connected to the enterprise permitter device 124. The enterprise client device 108 can communicate with another endpoint device through the AP 111 and the enterprise permitter device 124. Similarly, the enterprise client device 110 is wirelessly connected to the AP 112, which is connected to the visited permitter device 126. The enterprise client device 110 can communicate with another endpoint device through the AP 112 and the visited permitter device 126.

To avoid hairpins, the security framework supported by the security client 114 and the security server 118 supports a bypass feature that allows the enterprise client device 108 connected to the enterprise network 102 to directly access an on-premises resource, such as the on-premises resource 128.

The visited network 104 also supports a bypass feature. However, when the enterprise client device 110 is connected to the visited network 104, it may not be desirable to allow the enterprise client device 110 connected to have direct access to the on-premises resource 130 of the visited network 104, since doing so may violate an access control policy of the visited network 104. For example, the access control policy of the visited network 104 may specify that visiting client devices (such as the enterprise client device 110) should not be allowed access to certain on-premises resources (including the on-premise resource 130) of the visited network 104. However, the access control policy may specify that visiting client devices may be allowed access to other on-premise resources (e.g., the printer 132) of the visited network 104.

In accordance with some examples of the present disclosure, to prevent unauthorized access to an on-premises resource of a network (e.g., the visited network 104) by the enterprise client device 110 connected to the visited network 104, the security server 118 in the remote security system 106 can detect, based on a token, whether the network to which the enterprise client device 110 is connected is a network for which the enterprise client device 110 is authorized to directly access an on-premises resource based on the activation of a bypass feature of the network. The detection includes determining whether the token is authorized by the security server 118 for the visited network 104, where this determination is based on checking if the token is an authorized token provided by the security server 118 to the enterprise affiliated with the enterprise client device 110. Based on the determination, the security server 118 can send a response to the security client 116 in the enterprise client device 110 indicating whether the token is authorized, where the token if not authorized indicates that the visited network 104 is not operated by the enterprise that the enterprise client device 110 is affiliated with.

A token generator 134 in the security server 118 can generate tokens for each network, including the enterprise network 102 and the visited network 104. For example, the token generator 134 can generate a first collection of tokens (referred to as an "enterprise collection of tokens" 152) for the enterprise network 102, and a second collection of tokens (referred to as a "visited collection of tokens" 154) for the visited network 104. The collections of tokens 152 and 154 are different from one another. A "collection" of tokens can refer to a single token or multiple tokens. The collections of tokens 152 and 154 are stored in a data repository 150 of the remote security system 106.

In some examples, a token can be in the form of a one-time challenge (OTC) code. The OTC (also referred to as a one-time password or OTP) is a value (generated randomly, for example) provided by the token generator 134 in the security server 118 that can be used once by a client device for indicating which network a client device is connected to. In other examples, a token can be in the form of a secret, an authentication code, a key, or any other information element for indicating whether an enterprise client device is connected to an enterprise network or a different network.

The enterprise permitter device 124 includes a token manager 136 that stores, in a data repository 140, an enterprise collection of tokens 138 received from the token generator 134 of the remote security system 106. The enterprise collection of tokens 138 is a copy of the enterprise collection of tokens 152 stored at the remote security system 106. Similarly, the visited permitter device 126 includes a token manager 142 that stores, in a data repository 146, a visited collection of tokens 144 received from the token generator 134. The visited collection of tokens 144 is a copy of the enterprise collection of tokens 152 stored at the remote security system 106. Each token manager 136 or 142 can include machine-readable instructions executable by a processing resource of the respective permitter device 124 or 126.

Figure 2:
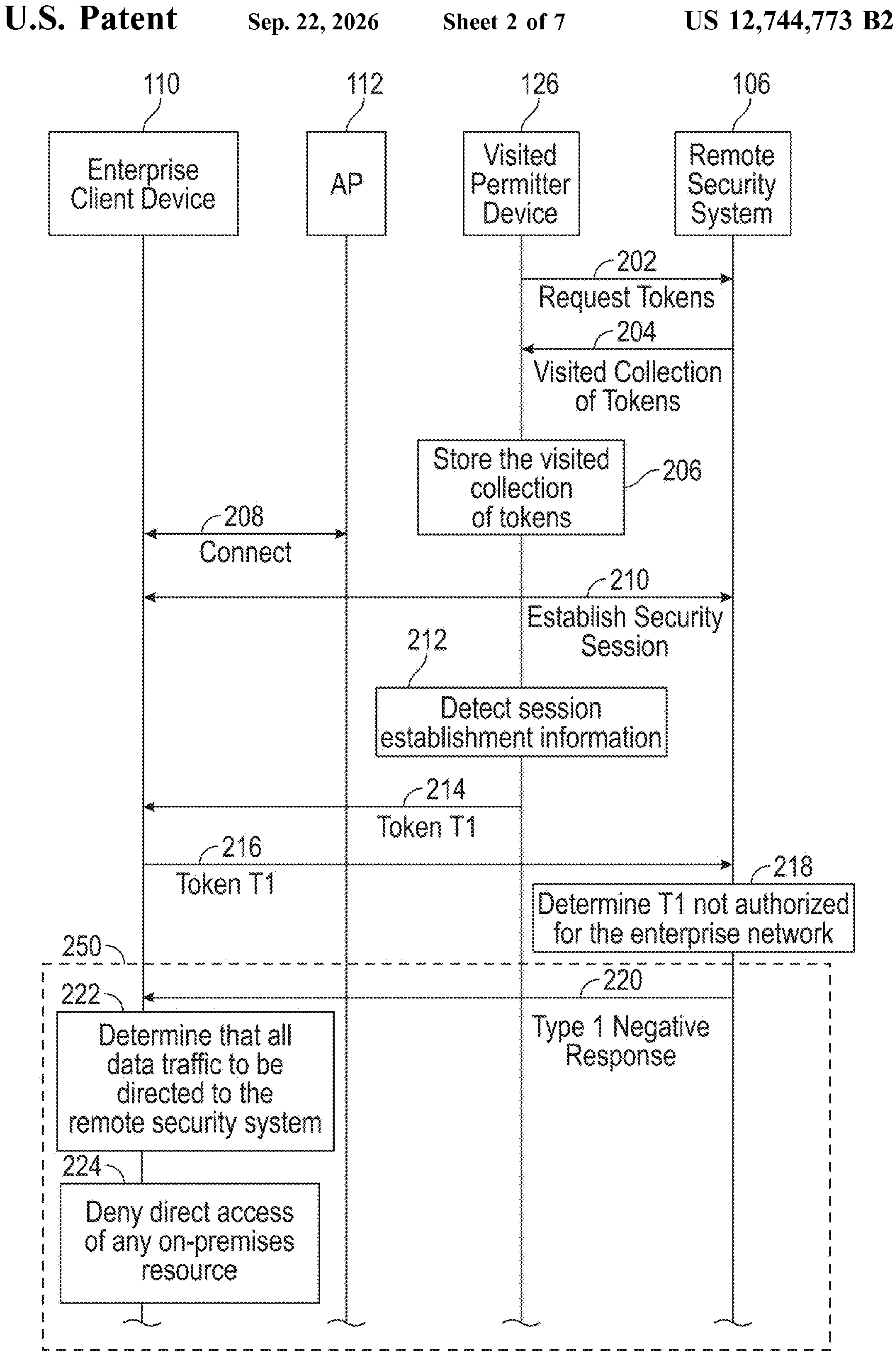
FIG. 2 and FIG. 3 are flow diagrams of processes according to some examples.
Figure 2:
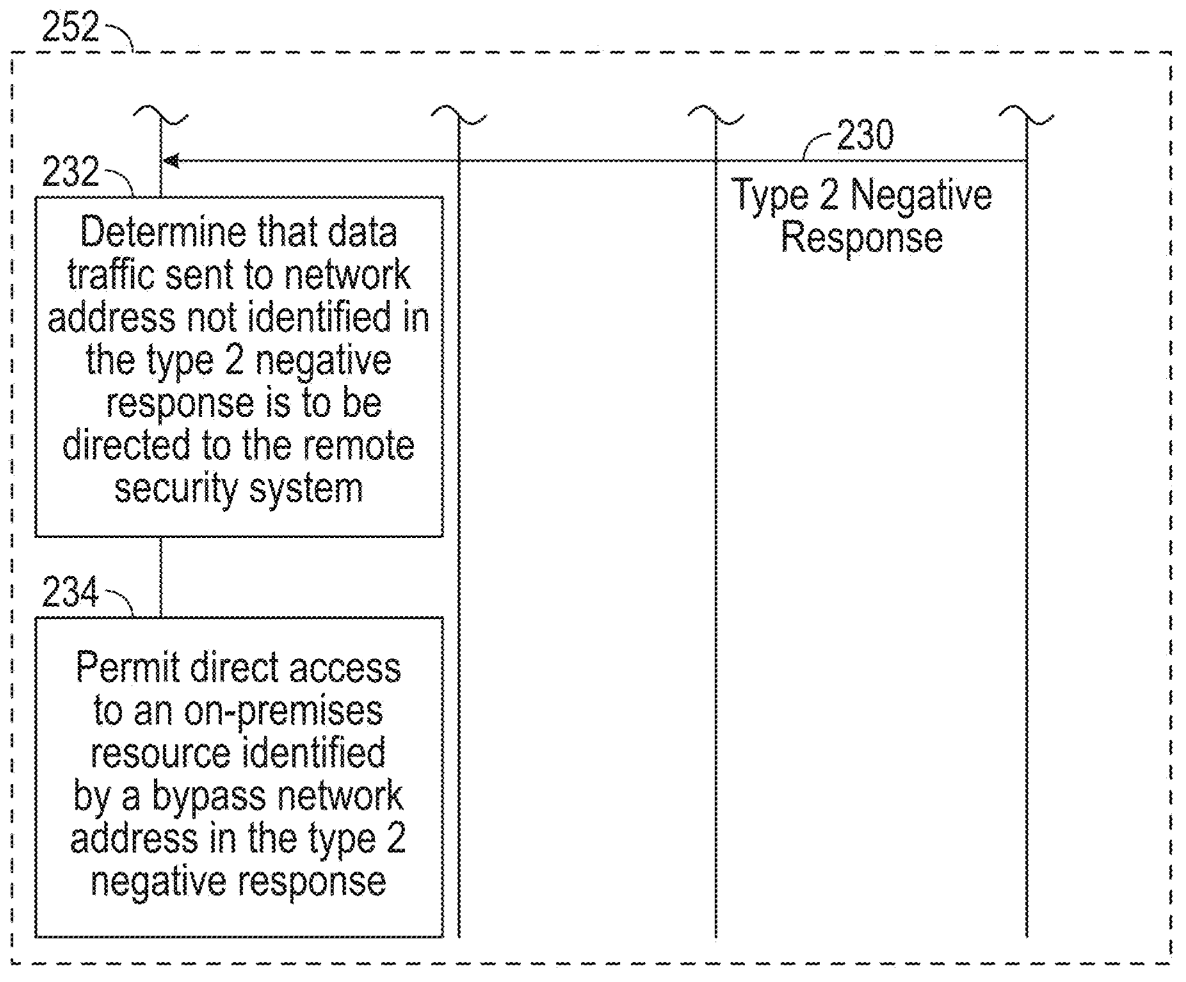

FIG. 2 is a flow diagram of a process involving the enterprise client device 110, the visited permitter device 126, and the remote security system 106. The following discussion also refers to FIG. 1. The token manager 142 in the visited permitter device 126 of the visited network 104 requests (at 202) tokens from the security server 118 of the remote security system 106. The request can be in the form of a message sent from the visited permitter device 126 to the remote security system 106, for example. The message can be according to a given protocol, such as a User Datagram Protocol (UDP), a Transmission Control Protocol (TCP), an Internet Control Message Protocol (ICMP), an Encapsulating Security Payload (ESP) protocol, a Generic Routing Encapsulation (GRE) protocol, or another protocol.

In response to the request, the token generator 134 in the remote security system 106 generates the visited collection of tokens 154 and sends (at 204) the visited collection of tokens 154 to the visited permitter device 126. The visited collection of tokens 154 can be included in a message according to the given protocol. The token manager 142 in the visited permitter device 126 stores (at 206) the received collection of tokens as the visited collection of tokens 144 in the data repository 146.

After the enterprise client device 110 first connects (at 208) to the AP 112 in the visited network 104, the enterprise client device 110 establishes (at 210) a security session between the enterprise client device 110 and the remote security system 106. The security session may be a ZTNA session, a VPN session, or another session associated with another security framework. The security session is established by exchanging session establishment information between the security client 116 and the security server 118 through the AP 112 and the visited permitter device 126. For example, the session establishment information can be carried in TCP messages, UDP messages, and so forth. Once the security session is established, the security client 116 in the enterprise client device 110 interacts with the security server 118 in the remote security system 106 to implement a security framework to authorize activities of the enterprise client device 110 in the visited network 104.

In response to detecting (at 212) the session establishment information sent by the enterprise client device 110 to the remote security system 106, the token manager 142 in the visited permitter device 126 sends (at 214) a token T1 retrieved from the visited collection of tokens 144 to the enterprise client device 110. Note that the visited permitter device 126 does not interrupt the session establishment between the enterprise client device 110 and the remote security system 106.

In some examples, the token T1 is included in an ICMP message sent from the visited permitter device 126 to the enterprise client device 110. ICMP is a protocol used by a network device, such as the visited permitter device 126, to send error messages and operational information indicating success or failure for communications in a network. For example, the ICMP message for carrying the token T1 can be an ICMP "destination unreachable" message, which indicates that a data packet is discarded because a destination is unreachable. The ICMP "destination unreachable" message has a payload in which the token T1 is carried. In other examples, other protocols can be used for sending tokens from a permitter device to a client device, such as the UDP, the Simple Network Management Protocol (SNMP), and so forth.

The enterprise client device 110 sends (at 216) the token T1 received from the enterprise permitter device 124 to the remote security system 106. The token T1 sent by the enterprise client device 110 can be included in a message sent in the session established between the enterprise client device 101108 and the remote security system 106. The message can be a message used in a ZNTA session, a VPN session, or any other security session.

The security server 118 in the remote security system 106 can determine that the enterprise client device 110 is affiliated with the enterprise that operates the enterprise network 102. The determination that the enterprise client device 110 is affiliated with the enterprise can be based on information of the enterprise client device 110, such as a certificate, a bearer token, identification information, or other information that provides an indication of which entity the enterprise client device 110 is affiliated with. As a result of determining that the enterprise client device 110 is affiliated with the enterprise, the security server 118 determines whether the token T1 is authorized for the enterprise network 102. The security server 118 can compare the token T1 to the enterprise collection of tokens 152 to determine whether the token T1 is authorized for the enterprise network 102 (i.e., whether the token T1 is an authorized token provided by the security server 118 to the enterprise affiliated with the enterprise client device 110). If the token T1 is not in the enterprise collection of tokens 152, then the security server 118 makes a determination that the token T1 is not authorized for the enterprise network 102. However, if the token T1 matches any token of the enterprise collection of tokens 152, then the security server 118 makes a determination that the token T1 is authorized for the enterprise network 102.

In the example of FIG. 2, since the token T1 is from the visited collection of tokens 144 stored at the visited permitter device 126, the token T1 would not match any token in the enterprise collection of tokens 152. As a result, the security server 118 determines (at 218) that the token T1 is not authorized for the enterprise network 102 operated by the enterprise with which the enterprise client device 110 is affiliated.

In response to the determination (at 218), the security server 118 sends a negative response to the enterprise client device 110 to indicate that the token T1 sent by the enterprise client device 110 to the security server 118 is not authorized for the enterprise network 102.

In some examples, there are two types of negative responses: a Type 1 negative response and a Type 2 negative response. FIG. 2 shows two examples 250 and 252 illustrating respective uses of the two types of negative responses.

The Type 1 negative response indicates that no direct access to any on-premises resource of the visited network 104 is permitted—i.e., the bypass feature of the security framework of the remote security system 106 is disabled for all on-premises resources (including the on-premises resource 130 and the printer 132 of FIG. 1) of the visited network 104. If the security server 118 sends (at 220) the Type 1 negative response to the enterprise client device 110, the security client 116 in the enterprise client device 110 can make a determination (at 222) that all data traffic sent by the enterprise client device 110 is to be directed to the remote security system 106 for authorization by the security server 118. If the enterprise client device 110 attempts to directly access any on-premises resource (e.g., 130 or 132 in FIG. 1) of the visited network 104, either the security client 116 or the security server 118 will deny (at 224) the direct access to the on-premises resource.

The Type 2 negative response indicates that direct access to a first collection of on-premises resources of the visited network 104 is not permitted, but direct access to a second collection of on-premises resources of the visited network 104 is permitted. For example, the Type 2 negative response can indicate that the enterprise client device 110 is not permitted direct access to the on-premises resource 130 of FIG. 1, but is permitted direct access to the printer 132 of FIG. 1. In some examples, the Type 2 negative response can identify bypass network address(es) of on-premises resource(s) for which direct access is permitted. Direct access to any network address not identified in the Type 2 negative response is denied. Stated differently, the Type 2 negative response indicates that the bypass feature is enabled for an on-premises resource of the visited network 104 identified by a bypass network address in the Type 2 negative response. However, the Type 2 negative response indicates that the bypass feature is disabled for any on-premises resource of the visited network 104 not identified by a bypass network address in the Type 2 negative response.

If the security server 118 sends (at 230) the Type 2 negative response to the enterprise client device 110, the security client 116 in the enterprise client device 110 can make a determination (at 232) that data traffic sent by the enterprise client device 110 to network addresses not identified in the Type 2 negative response is to be directed to the remote security system 106 for authorization by the security server 118. However, data traffic sent by the enterprise client device 110 to bypass network address(es) identified in the Type 2 negative response is permitted (at 234) to be directly sent to the respective on-premises resource(s) of the visited network 104. For example, the security client 116 in the enterprise client device 110 or the security server 118 can deny direct access to the on-premises resource 130 of FIG. 1, but the security client 116 in the enterprise client device 110 or the security server 118 can permit direct access to the printer 132 of FIG. 1 of the visited network 104.

Figure 3:
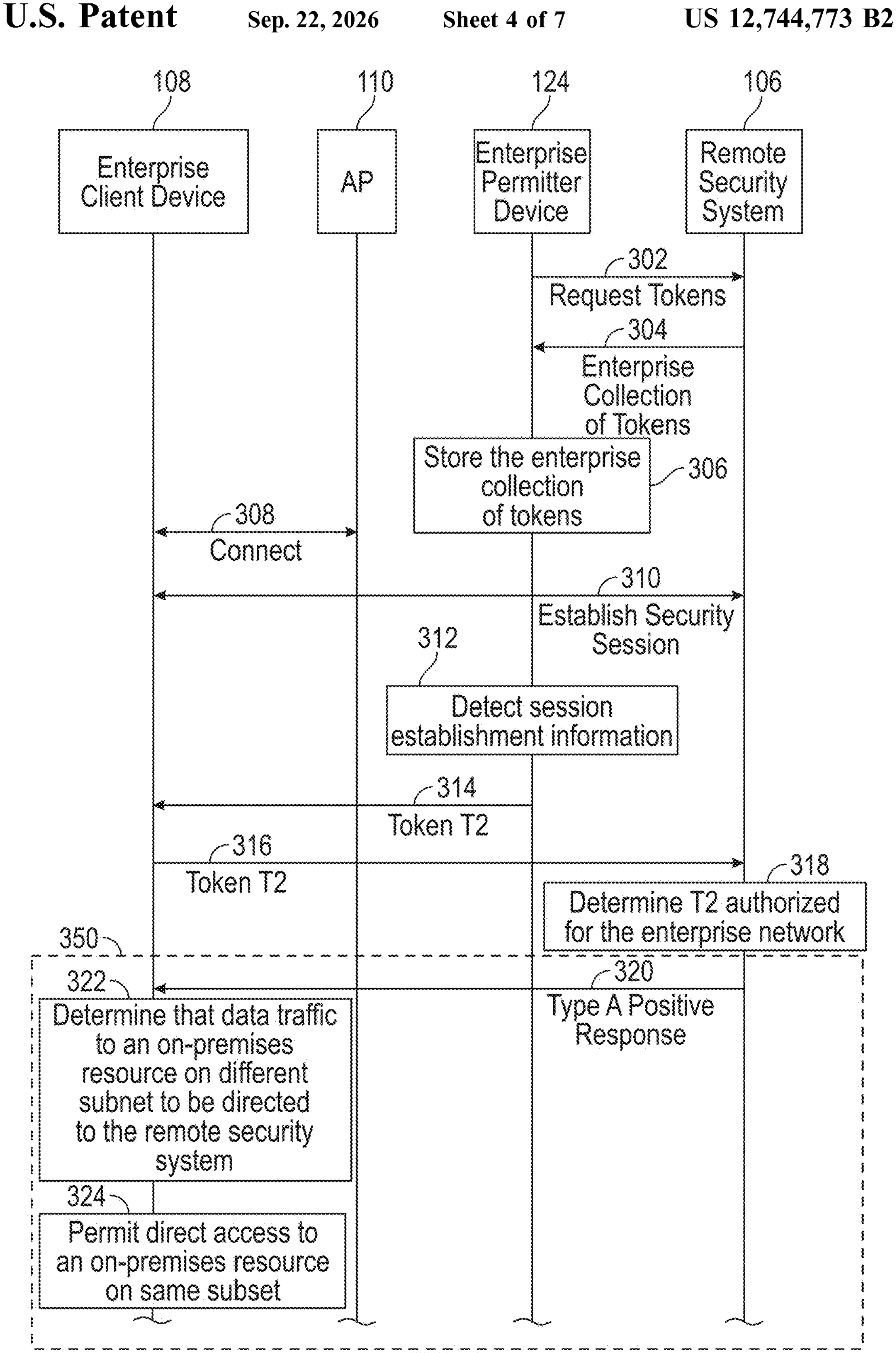
Figure 3:
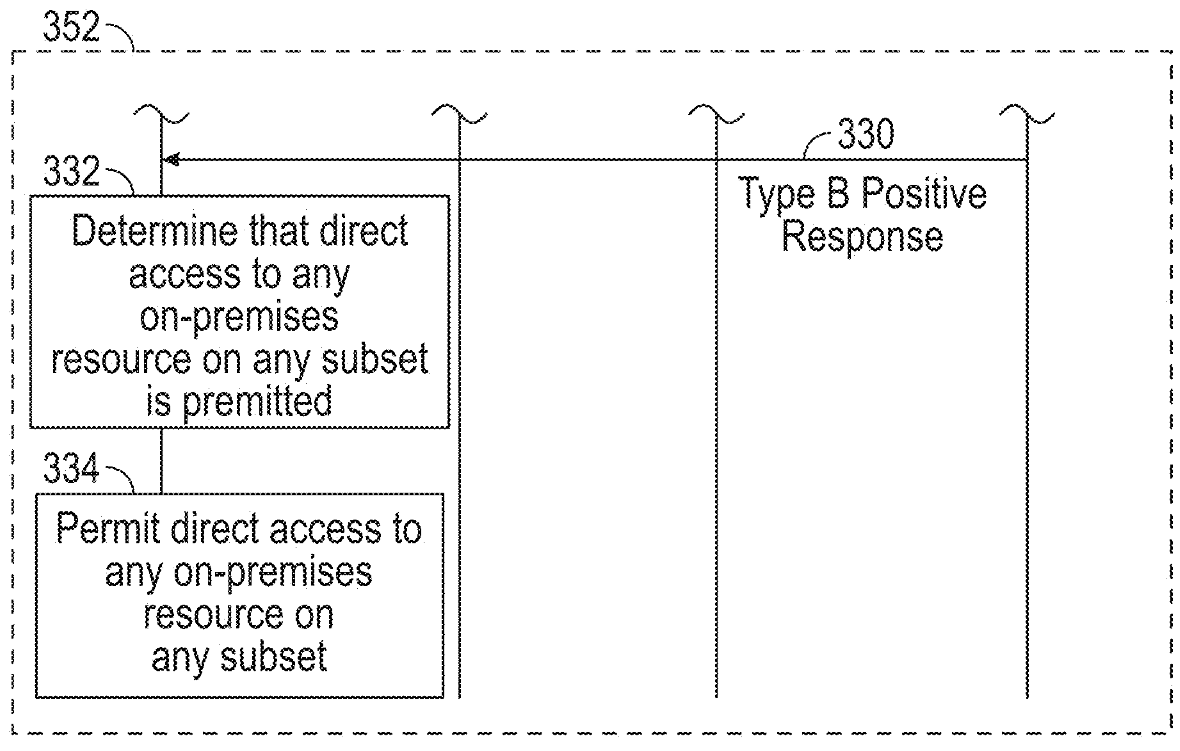

FIG. 3 is a flow diagram of a process involving the enterprise client device 108, the enterprise permitter device 124, and the remote security system 106. The token manager 136 in the enterprise permitter device 124 of the enterprise network 102 requests (at 302) tokens from the security server 118 of the remote security system 106. In response to the request, the token generator 134 in the remote security system 106 generates the enterprise collection of tokens 152 and sends (at 304) the enterprise collection of tokens 152 to the visited permitter device 126. The token manager 136 in the enterprise permitter device 124 stores (at 306) the received collection of tokens as the enterprise collection of tokens 138 in the data repository 140.

After the enterprise client device 108 first connects (at 308) to the AP 111 in the enterprise network 102, the enterprise client device 108 establishes (at 310) a security session between the enterprise client device 108 and the remote security system 106. Once the security session is established, the security client 114 in the enterprise client device 108 interacts with the security server 118 in the remote security system 106 to implement a security framework to authorize activities of the enterprise client device 108 in the enterprise network 102.

In response to detecting (at 312) the session establishment information sent by the enterprise client device 108 to the remote security system 106, the token manager 136 in the enterprise permitter device 123 sends (at 314) a token T2 retrieved from the enterprise collection of tokens 138 to the enterprise client device 108. In some examples, the token T2 is included in an ICMP message (or another type of message) sent from the enterprise permitter device 123 to the enterprise client device 110. Note that the enterprise permitter device 124 does not interrupt the session establishment between the enterprise client device 108 and the remote security system 106.

The enterprise client device 108 sends (at 316) the token T2 received from the enterprise permitter device 124 to the remote security system 106. The token T2 sent by the enterprise client device 108 can be included in a message sent in the session established between the enterprise client device 108 and the remote security system 106. The message can be a message used in a ZNTA session, a VPN session, or any other security session.

The security server 118 in the remote security system 106 can determine that the enterprise client device 108 is affiliated with the enterprise that operates the enterprise network 102. As a result, the security server 118 determines whether the token T2 is authorized for the enterprise network 102. The security server 118 can compare the token T2 to the enterprise collection of tokens 152 to determine whether the token T2 is authorized for the enterprise network 102 (i.e., whether the token T2 is an authorized token provided by the security server 118 to the enterprise affiliated with the enterprise client device 108). If the token T2 is not in the enterprise collection of tokens 152, then the security server 118 makes a determination that the token T2 is not authorized for the enterprise network 102. However, if the token T2 matches any token of the enterprise collection of tokens 152, then the security server 118 makes a determination that the token T2 is authorized for the enterprise network 102.

In the example of FIG. 3, since the token T2 is from the enterprise collection of tokens 138 stored at the enterprise permitter device 124, the token T2 would match a token in the enterprise collection of tokens 152. As a result, the security server 118 determines (at 318) that the token T2 is authorized for the enterprise network 102 operated by the enterprise with which the enterprise client device 110 is affiliated.

In response to the determination (at 318), the security server 118 sends a positive response to the enterprise client device 108 to indicate that the token T2 sent by the enterprise client device 108 to the security server 118 is authorized for the enterprise network 102.

In some examples, there are two types of positive responses: a Type A positive response and a Type B positive response. FIG. 3 shows two examples 350 and 352 illustrating respective uses of the two types of positive responses.

The Type A positive response indicates that the enterprise client device 108 is permitted to directly access any on-premises response that is on the same subnet as the enterprise client device 108. A subnet is a segment of a network that can be identified by a portion of a network address, such as a portion of an IP address. However, the Type A positive response indicates that the enterprise client device 108 is not permitted to directly access any on-premises response that is on a subnet different from subnet to which the enterprise client device 108 is connected.

If the security server 118 sends (at 320) the Type A positive response to the enterprise client device 108, the security client 114 in the enterprise client device 108 can make a determination (at 322) that data traffic sent by the enterprise client device 108 to an on-premises resource not on the same subnet as the enterprise client device 108 is to be directed to the remote security system 106 for authorization by the security server 118. However, direct access by the enterprise client device 108 to an on-premises resource on the same subnet as the enterprise client device 108 is permitted (at 324) by the security client 114.

The Type B positive response indicates that the enterprise client device 108 is permitted to directly access any on-premises response that is on any subnet of the enterprise network 102, including a subnet that is different from the subset to which the enterprise client device 108 is connected.

If the security server 118 sends (at 330) the Type B positive response to the enterprise client device 108, the security client 114 in the enterprise client device 108 can make a determination (at 332) that direct access to any on-premises resource on any subnet of the enterprise network 102 is allowed. The security client 114 in the enterprise client device 108 can permit (at 334) direct access to any on-premises resource on any subnet of the enterprise network 102.

A response sent by the security server 118 (e.g., at 220, 230, 320, or 330 in FIG. 2 or 3) can be in the form of a response message with information elements to indicate whether the response is a negative or positive response, and the specific type of negative or positive response. For example, the response message can include an information element (or multiple information elements) settable to different values to indicate the four possible combinations (Type 1 negative response, Type 2 negative response, Type A positive response, or Type B positive response).

Figure 4:
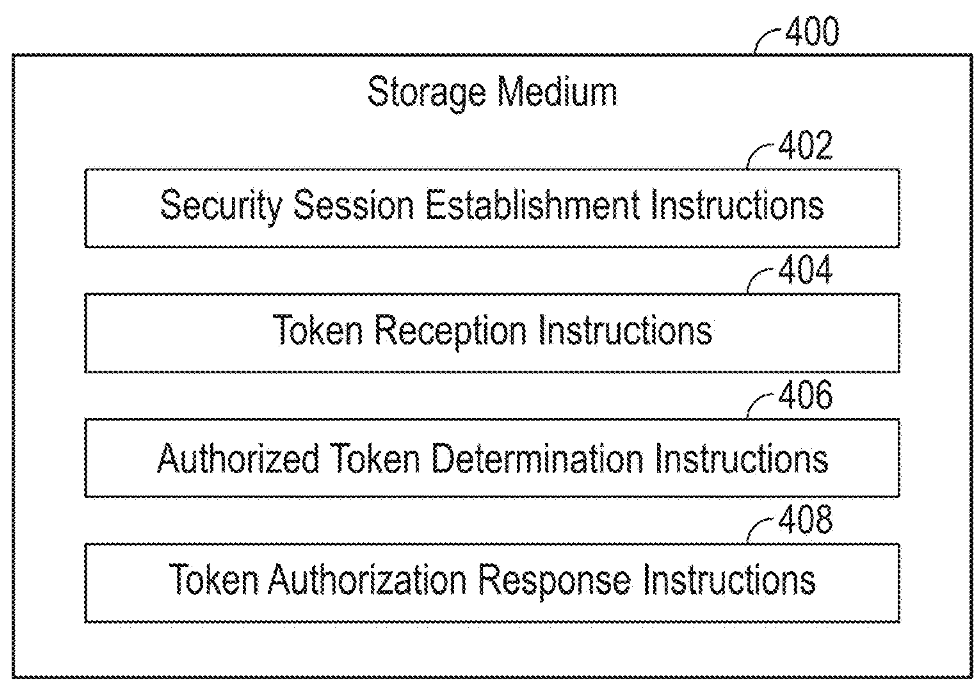
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a security system to perform various tasks. The security system may be implemented using one or more computers. An example of the security system is the remote security system 106 of FIG. 1.

The machine-readable instructions include security session establishment instructions 402 to receive, at the security system, session establishment information from a client device connected to a network, the session establishment information to establish a session between the client device and the security system. The security system is remote from the network. The network may be the enterprise network 102 or the visited network 104 of FIG. 1, for example.

The machine-readable instructions include token reception instructions 404 to receive, at the security system from the client device, a token sent to the client device by a network device of the network responsive to the network device detecting the session establishment information. An example of the network device is the enterprise permitter device 124 or the visited permitter device 126 of FIG. 1, for example.

The machine-readable instructions include authorized token determination instructions 406 to determine whether the token is authorized by the security system for an entity affiliated with the client device. For example, the client device is an enterprise client device affiliated with an enterprise that operates an enterprise network. The determination is based on checking if the token is an authorized token provided by the security system to the entity affiliated with the client device.

The machine-readable instructions include token authorization response instructions 408 to send, from the security system based on the determination, a response indicating whether the token is authorized. The token if authorized indicates that the network to which the client device is connected is operated by the entity that the electronic device is affiliated with. The token if not authorized indicates that the network to which the client device is connected is not operated by the entity that the electronic device is affiliated with.

In some example, the token if authorized activates a bypass feature supported by the security system to permit direct access by the client device to an on-premises resource of the network.

In some examples, the direct access by the client device to the on-premises resource permitted by the bypass feature is a direct access to the on-premises resource on a first subnet to which the client device is connected.

In some examples, access is blocked to a second subnet of the network to which the client device is not connected.

In further examples, the direct access by the client device to the on-premises resource permitted by the bypass feature is a direct access to the on-premises resource on any of a plurality of subnets of the network.

In some examples, the token includes an OTC code. The determination of whether the token is authorized by the security system for the entity affiliated with the client device is based on checking if the OTC code is one of a plurality of OTC codes provided by the security system to the entity affiliated with the client device.

In some examples, the authorized token is provided by the security system to the network device of the network operated by the entity.

In some examples, the token from the client device is sent to the client device by the network device that is one of a router, a firewall device, or a gateway device of the network.

In some examples, the determination of whether the token is authorized by the security system for the entity affiliated with the client device includes identifying the token as unauthorized based on the token not matching any token provided by the security system to the entity affiliated with the client device.

In some examples, the token being unauthorized blocks direct access by the client device to an on-premises resource of the network.

Figure 5:
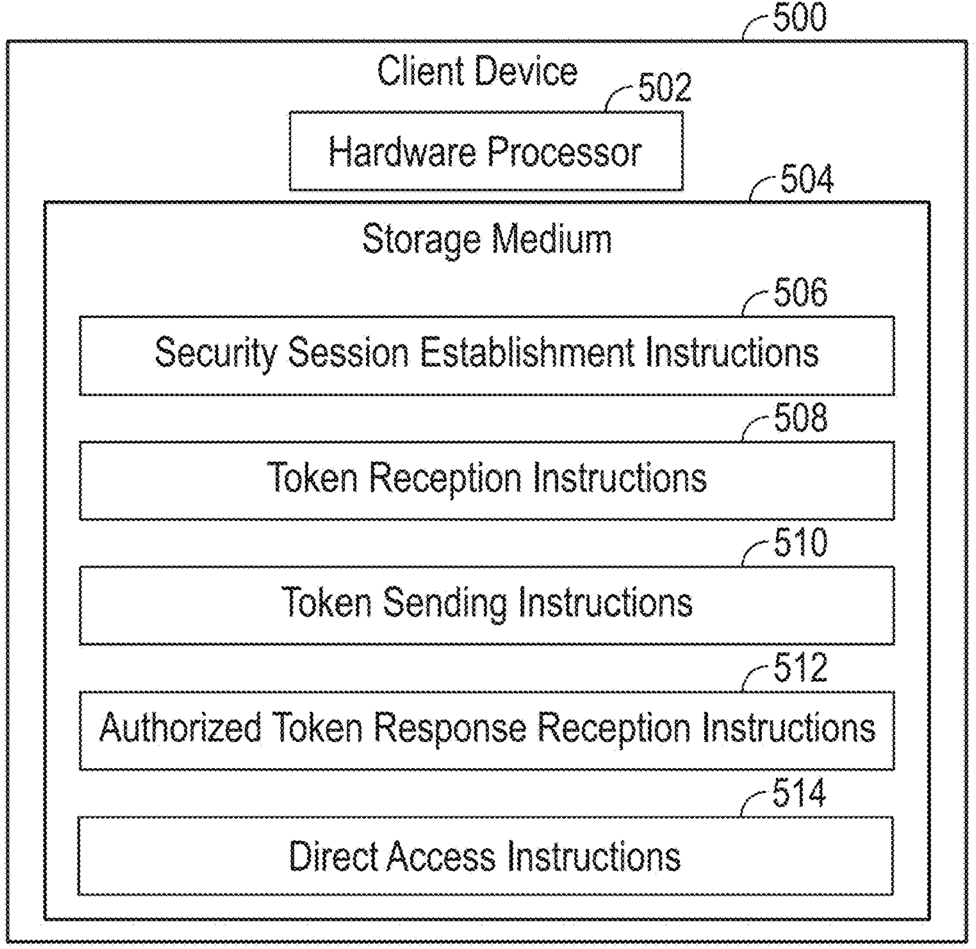
FIG. 5 is a block diagram of a client device according to some examples.

FIG. 5 is a block diagram of a client device 500 according to some examples of the present disclosure. The client device 500 may be the enterprise client device 108 or 110 of FIG. 1, for example.

The client device 500 includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The client device 500 includes a storage medium 504 storing machine-readable instructions executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include security session establishment instructions 506 to establish a session with a remote security system by sending session establishment information from the client device to the remote security system. The remote security system is to authorize access of the client device to a network.

The machine-readable instructions in the storage medium 504 include token reception instructions 508 to receive, at the client device, a token from a network device of the network. The token is sent from the network device to the client device based on the network device detecting the session establishment information from the client device to the remote security system.

The machine-readable instructions in the storage medium 504 include token sending instructions 510 to, after receiving the token from the network device, send the token from the network device to the remote security system. The token can be sent by the client device 500 to the remote security system in the security session between the client device 500 and the remote security system.

The machine-readable instructions in the storage medium 504 include authorized token response reception instructions 512 to receive, at the client device from the remote security system, a response indicating whether the token is authorized for an entity affiliated with the client device. The response can be a negative response or a positive response (e.g., sent at 220, 230, 320, or 330 in FIG. 2 or 3).

The machine-readable instructions in the storage medium 504 include direct access instructions 514 to, based on the response indicating that the token is authorized (i.e., the response is a positive response), perform direct access by the client device to an on-premises resource of the network based on activation of a bypass feature of the remote security system.

In some examples, the activation of the bypass feature is triggered by a security client executed at the client device, or the activation of the bypass feature is triggered by the remote security system.

In some examples, the token is included in an ICMP message.

Figure 6:
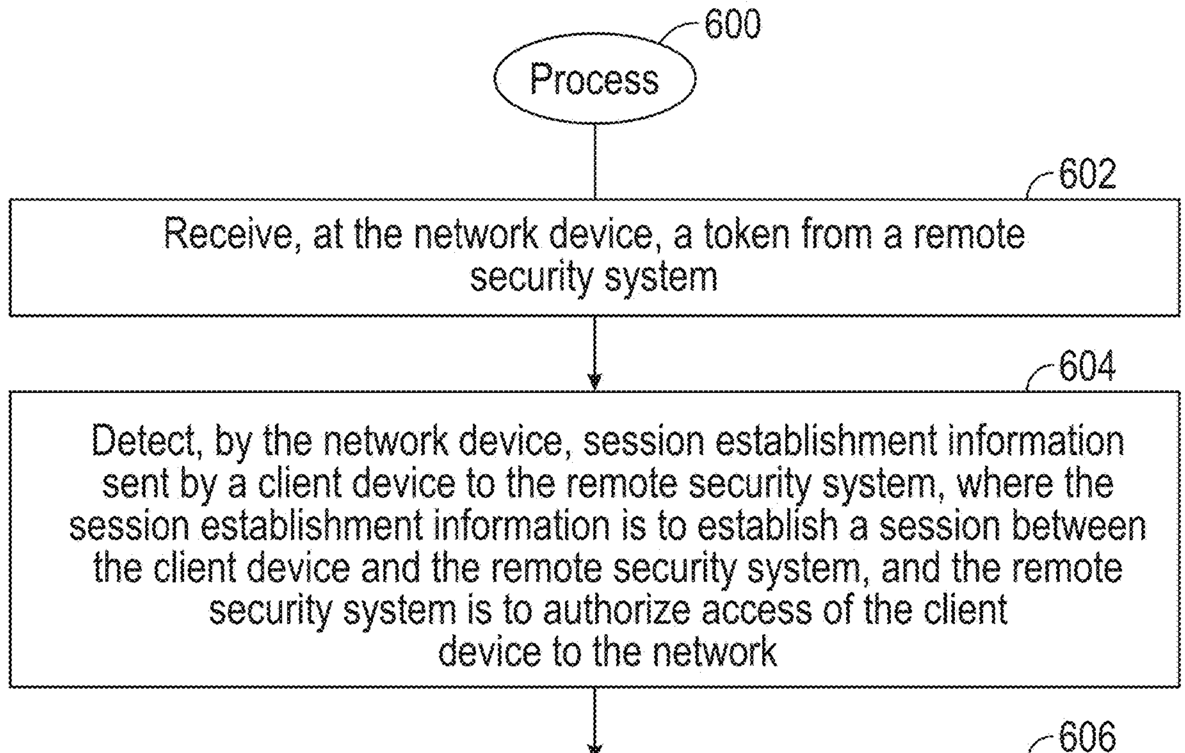
FIG. 6 is a flow diagram of a process of a network device according to some examples.

FIG. 6 is a flow diagram of a process 600 performed by a network device of a network according to some examples of the present disclosure. The network device may be a permitter device, such as the enterprise permitter device 124 or visited permitter device 126 of FIG. 1.

The process 600 includes receiving (at 602), at the network device, a token from a remote security system. The token may be part of a collection of tokens generated by the remote security system and sent to the network device.

The process 600 includes detecting (at 604), by the network device, session establishment information sent by a client device to a remote security system, where the session establishment information is to establish a session between the client device and the remote security system, and the remote security system is to authorize access of the client device to the network.

The process 600 includes sending (at 606), based on detecting the session establishment information, the token from the network device to the client device, the token useable by the client device to trigger a bypass feature of the remote security system to permit a direct access by the client device to an on-premises resource of the network.

As used here, a "data repository" can be implemented using one or more storage devices, such as disk-based storage devices, solid-state drives, or other types of storage devices. A "processing resource" includes one or more hardware processors.

FIGS. 2, 3, and 6 show tasks in specific orders. In other examples, the tasks may be performed in a different order, some of the tasks may be omitted, and other tasks may be added.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM), or a flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a security system to:

receive, at the security system, session establishment information from a client device connected to a network, the session establishment information to establish a session between the client device and the security system, wherein the security system is remote from the network;

receive, at the security system from the client device, a token sent to the client device by a network device of the network responsive to the network device detecting the session establishment information;

determine whether the token is authorized by the security system for an entity affiliated with the client device, the determining based on checking if the token is an authorized token provided by the security system to the entity affiliated with the client device; and send, from the security system based on the determining, a response indicating whether the token is authorized, wherein the token if authorized indicates that the network is operated by the entity that the client device is affiliated with.

2. The non-transitory machine-readable storage medium of claim 1, wherein the token if authorized activates a bypass feature supported by the security system to permit direct access by the client device to an on-premises resource of the network.

3. The non-transitory machine-readable storage medium of claim 2, wherein the direct access by the client device to the on-premises resource permitted by the bypass feature is a direct access to the on-premises resource on a first subnet to which the client device is connected.

4. The non-transitory machine-readable storage medium of claim 3, wherein access is blocked to a second subnet of the network to which the client device is not connected.

5. The non-transitory machine-readable storage medium of claim 2, wherein the direct access by the client device to the on-premises resource permitted by the bypass feature is a direct access to the on-premises resource on any of a plurality of subnets of the network.

6. The non-transitory machine-readable storage medium of claim 1, wherein the token comprises a one-time challenge (OTC) code.

7. The non-transitory machine-readable storage medium of claim 6, wherein the determining of whether the token is authorized by the security system for the entity affiliated with the client device is based on checking if the OTC code is one of a plurality of OTC codes provided by the security system to the entity affiliated with the client device.

8. The non-transitory machine-readable storage medium of claim 1, wherein the authorized token is provided by the security system to the network device of the network operated by the entity.

9. The non-transitory machine-readable storage medium of claim 1, wherein the token from the client device is sent to the client device by the network device that is one of a router, a firewall device, or a gateway device of the network.

10. The non-transitory machine-readable storage medium of claim 1, wherein the determining comprises identifying the token as unauthorized based on the token not matching any token provided by the security system to the entity affiliated with the client device.

11. The non-transitory machine-readable storage medium of claim 10, wherein the token being unauthorized blocks direct access by the client device to an on-premises resource of the network.

12. The non-transitory machine-readable storage medium of claim 1, wherein the instructions upon execution cause the security system to:

execute a security server that interacts with a security client in the client device to implement a zero trust security framework.

13. A client device comprising:

a hardware processor; and a non-transitory storage medium comprising instructions executable on the hardware processor to:

establish a session with a remote security system by sending session establishment information from the client device to the remote security system, the remote security system to authorize access of the client device to a network;

receive, at the client device, a token from a network device of the network, the token sent from the network device to the client device based on the network device detecting the session establishment information from the client device to the remote security system;

after receiving the token from the network device, send the token from the network device to the remote security system;

receive, at the client device from the remote security system, a response indicating whether the token is authorized for an entity affiliated with the client device; and based on the response indicating that the token is authorized, perform direct access by the client device to an on-premises resource of the network based on activation of a bypass feature of the remote security system.

14. The client device of claim 13, wherein the activation of the bypass feature is triggered by a security client executed at the client device.

15. The client device of claim 13, wherein the activation of the bypass feature is triggered by the remote security system.

16. The client device of claim 13, wherein the token is included in an Internet Control Message Protocol (ICMP) message.

17. The client device of claim 13, wherein the token is generated by the remote security system for the network and sent to the network device of the network.

18. The client device of claim 13, wherein the session establishment information is to establish the session between the client device and the remote security system for a zero trust security framework.

19. A method comprising:

receiving, at a network device of a network, a token from a remote security system;

detecting, by the network device, session establishment information sent by a client device to the remote security system, the session establishment information to establish a session between the client device and the remote security system, and the remote security system to authorize access of the client device to the network; and based on detecting the session establishment information, sending the token from the network device to the client device, the token useable by the client device to trigger a bypass feature of the remote security system to permit a direct access by the client device to an on-premises resource of the network.

20. The method of claim 19, wherein the token is part of a collection of tokens received by the network device from the remote security system based on a request from the network device to the remote security system.

* * * * *